United States Patent [19]

Vila-Masot et al.

[11] Patent Number: 4,935,673
[45] Date of Patent: Jun. 19, 1990

[54] VARIABLE IMPEDANCE ELECTRONIC BALLAST FOR A GAS DISCHARGE DEVICE

[75] Inventors: Oscar Vila-Masot, Puerto La Cruz; Peter Deli, Caracas, both of Venezuela

[73] Assignee: Led Corporation, St. Maarten, Netherlands

[21] Appl. No.: 154,882

[22] Filed: Feb. 11, 1988

Related U.S. Application Data

[63] Continuation-in-part of Ser. No. 71,184, Jul. 8, 1987, abandoned.

[51] Int. Cl.$^5$ .................. H05B 41/24; H05B 41/36
[52] U.S. Cl. .................. 315/219; 315/221; 315/224; 315/307; 315/DIG. 7
[58] Field of Search .................. 315/208, 209 R, 219, 315/221, 222, 223, 224, 225, 226, 307, DIG. 7

[56] References Cited

U.S. PATENT DOCUMENTS 4,134,044 1/1979 Holmes .................. 315/209 R

Primary Examiner—David Mis
Attorney, Agent, or Firm—Hoffman, Wasson, Fallow & Gitler

[57] ABSTRACT

A parallel RC network sensitive to the impedance of a gas discharge device is provided in the electronic ballast of this device along with a series connected inductive coil. As the impedance through the device changes, the oscillator frequency of the ballast would change accordingly and the voltage through the coil would change, thereby changing the impedance in such a manner as to insure that the voltage through the gas discharge device remains unchanged. The ballast would include a switch-mode, push-pull oscillator including a pair of emitter-resistors and a pair of fast diodes.

8 Claims, 4 Drawing Sheets

VARIABLE IMPEDANCE ELECTRONIC BALLAST FOR A GAS DISCHARGE DEVICE

This is a continuation-in-part of application Ser. No. 071,184, filed July 8, 1987, now abandoned.

Generally, when a gas discharge device, such as a high pressure sodium lamp is operated safely and efficiently for long periods of time, a starting voltage level several times greater than the quiescent operating voltage level is required to operate the gas discharge system. Starting voltage impulses are produced which do not harm the device, the various components utilized in a ballast circuit and individuals in the environment of the device. When the gas discharge lamp begins to operate smoothly, the starting voltage level is reduced to a level sufficient to continue the arc discharge. This type of gas discharge device cannot be operated directly from line voltage because of the inherent negative resistance characteristic of the device. Therefore, efficient operation of this gas discharge device with the correct power factor can only be effectuated if a precisely calculated reactance and compensated power output in series connection with the gas discharge device is provided.

This prior art circuit is illustrated with respect to FIG. 1 which includes a gas discharge device 1 in series with an inductive coil 2 which acts as the series coupled impedance with the device 1. Incoming power is supplied through terminals 3 and 4. Terminal 4 is connected to circuit line 4a which is connected to a starting aid 5 which is in parallel with the gas discharge device 1. Terminal 3 is connected to line 3a which is connected to the inductive coil 2. Capacitor 6 placed across lines 3a and 4a is used for power factor correction and current control of the device. An initial current flow from a standard source would activate the starting aid 5 to open its normally closed contacts. At this point, current ceases to flow through the inductive coil 2 and a high voltage pulse is created which ignites the gas discharge device 1 of the gas discharge system. This arc voltage insures that current will flow continuously through the starter aid 5 thereby constantly maintaining the starter contacts in the open position.

While this prior art circuit has been found to operate efficiently when the gas discharge system employs new components and a new gas discharge device, aging of this device through normal operating conditions causes a static resistance change, and the performance of the gas discharge system would begin to deteriorate.

Therefore, a system must be developed which does not exhibit the deficiencies of the prior art gas discharge device systems employing an electronic ballast.

SUMMARY OF THE INVENTION

The present invention overcomes the deficiencies of the prior art by providing an electronic ballast which compensates for the deterioration of the gas discharge device and is designed to ignite and power all types of high pressure lamps. Due to of the aging of the gas discharge device, the precisely calculated reactance and therefore the impedance of the inductive coil would change. This change of impedance is due to the deterioration of the gas discharge device itself. The present invention compensates for this change in impedance by sensing such a change and then automatically compensating for this change such that the actual impedance through the inductive coil would not change, regardless of the aging of the gas discharge device.

Additionally, the efficiency and long-range operating life of the gas discharge system is maintained by insuring that the operating frequency of the system is equal to or greater than 20 kilohertz, a frequency undetectable by humans. More particularly, the range of the oscillator components is in the range of between 20 and 40 kilohertz. Traditional prior art ballasts require a starting voltage be applied to the gas discharge device which is several times greater than the operating voltage. Additionally, due to the negative resistance of the gas discharge device, it cannot be operated directly from a distribution circuit. The electronic ballast of the present invention operates according to these parameters as well ensuring that the device's operating current remains at a constant level regardless of the aging of the gas discharge device which would normally result in a higher current, and would result in a shorter life span for the device. This life span is increased, according to the teachings of the present invention, by operating the device with an operating frequency of greater than 20 KHz. This feature must be contrusted with prior art devices which are operated with a 50–60 Hz AC line supply.

The foregoing, as well as other objects, features and advantages of the present invention, will become more apparent from the following detailed description taken in conjunction with the appended drawings.

DESCRIPTION OF THE PREFERRED EMBODIMENT

Figure 2:
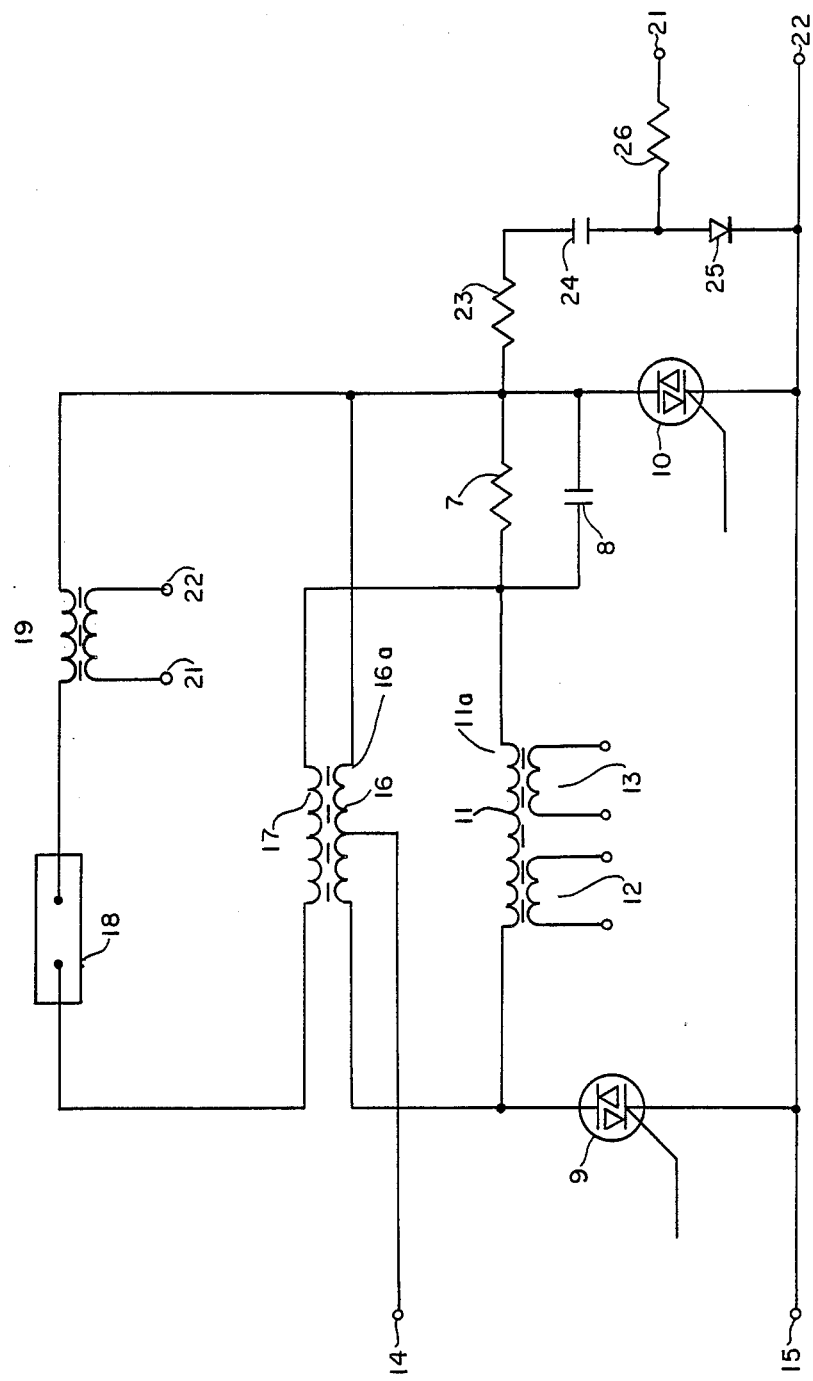
FIG. 2 is a circuit diagram of one embodiment of the present invention.

FIG. 2 illustrates a gas discharge device system including an electronic ballast which is provided with a circuit sensitive to the change in impedance of an inductive coil connected in series with a gas discharge device and automatically compensating for this change in impedance. The circuit is connected to a line voltage or other power sources commonly known in the art through terminals 14 and 15. This power source could include a 50–60 Hertz AC line supply. A transformer 11a is provided having a primary 11 and two secondary sides 12 and 13. This transformer 11a is used to control two electronic switches 9 and 10. These switches can be standard state-of-the-art switches, such as silicon-controlled rectifiers, thyristors, triacs or diacs. The combination of the electronic switches 9 and 10 as well as the transformer 11a creates an inductively coupled square wave oscillator which is fed DC voltage through the electronic switches 9 and 10 having a common node at terminal 15. A parallel RC circuit including resistor 7 and capacitor 8 is connected to the transformer 11a as well as an inductive coil 19 provided with windings 21 and 22. The inductive coil is in turn in series with a gas discharge device 18 which is known in the art. It is noted that the resistor 7 and capacitor 8 are generally shorted out by the electronic switches 9 and 10. Output terminal 14 is directly connected to the center tap primary 16 of a transformer 16a also provided with a secondary 17 which is connected to the gas discharge device 18 as well as the RC circuit combination. The value of the transformer 11a as well as the electronic switches 9 and 10 can be determined such as to produce a square wave oscillator having a frequency of at least 20 kilohertz. Additionally, the impedances of the transformer 11a as well as the electronic switches 9 and 10 can be calculated to effectuate the proper control of these switches.

Assuming that the resistor 7 and capacitor 8 are shorted out, the voltage at the transformer secondary 17 powers the gas discharge device 18 with the series inductive coil 19 in the manner similar to the prior art with the inductive coil 19 acting as the series coupled impedance.

If the DC voltage terminals 14 and 15 should change or become unstable, the current through the gas discharge device 18 would remain constant since the impedance of the inductive coil 19 would also change due to a shift in the oscillator frequency created by the unstable DC voltage. Therefore, a change in the DC voltage would not change the series coupled impedance and the operation of the gas discharge system would remain constant.

However, due to the aging of the gas discharge device 18, the impedance of the gas discharge device would change. Since the impedance of the gas discharge device changes, the current through the circuitry would also change. Resistor 7 and capacitor 8 are used to eliminate this change in current by creating an impedance having the same current flow through them as through the gas discharge device 18 and the inductive coil 19 by developing a voltage drop across the impedance created by the resistor 7 and capacitor 8. The voltage drop created by the resistor 7 and the capacitor 8 develops a current through this impedance combination having a magnitude and phase of the voltage and current produced by the value of the resistor 7 and the capacitor 8. Since the current flow through the resistor 7 and capacitor 8 is in series with the primary side 11 of the transformer 11a, this current flow controls the oscillating frequency of the square wave oscillator. Therefore, when the static resistance of the gas discharge device 18 decreases, the oscillator frequency would increase and the impedance of the inductive coil 19 would increase proportional to the decrease of the static resistance and the current flowing through the gas discharge device 18 remains unchanged.

As shown in FIG. 2, the windings 21 and 22 are connected to a resistor 26 and a rectifier 25. When the electronic switch 10 opens, a capacitor 24 would become charged. When the electronic switch 10 closes, the capacitor 24 is discharged through a resistor 23, the electronic switch 10, the windings 21 and 22 and the resistor 26. If the number of turns of the inductive windings 21 and 22 is properly chosen along with the particular values of the resistors 23 and 26 and the capacitor 24, a voltage surge is created in the inductive coil 19 which would be sufficient to ignite the gas discharge device 18. The resultant impedance of the transformer 16a including the primary 16 and secondary 17 as well as resistor 7 and capacitor 8 is negligible when compared with the impedance of the gas discharge device which is effectively infinity before igniting. In this manner, virtually the entire amplitude of the induced voltage in the inductive coil 19 would be transmitted to the gas discharge device 18. After the ignition of the gas discharge device 18, no high voltage is transmitted through the inductive winding 19 due to the discharge of the capacitor 24.

Figure 1:
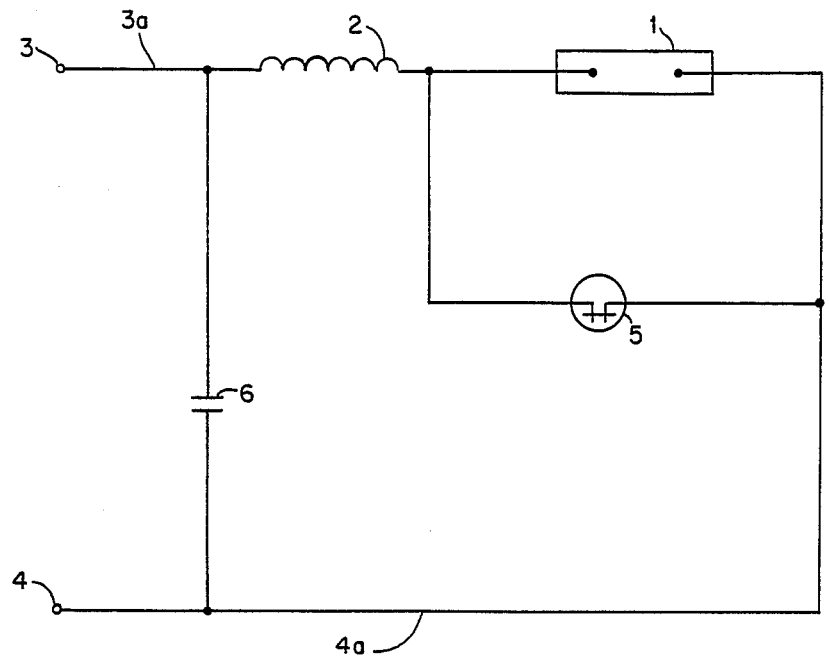
FIG. 1 is a circuit diagram showing the prior art starting circuit of a gas discharge device.
Figure 3:
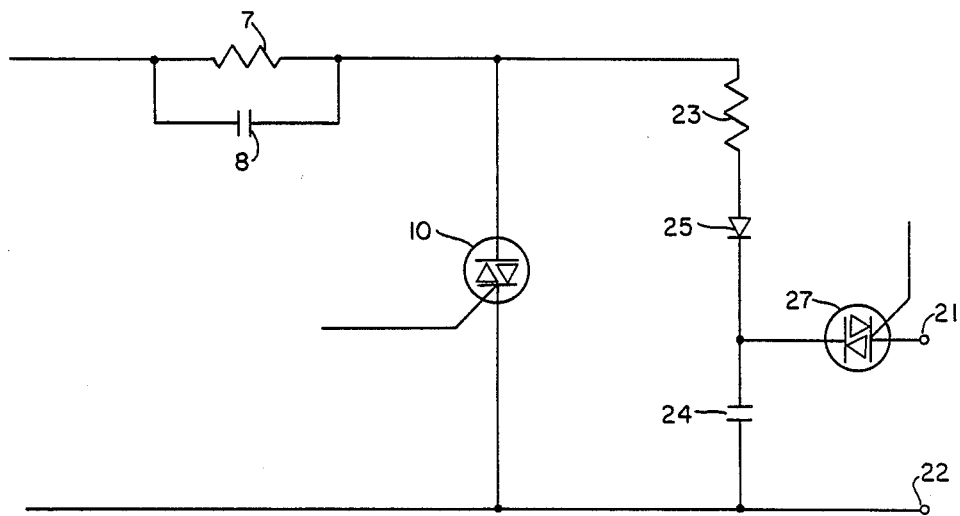
FIG. 3 is a circuit diagram of the present invention showing an additional embodiment thereof.

FIG. 3 illustrates an embodiment of the present invention for igniting a high power gas discharge device. In this embodiment, an additional electronic switch 27 is connected to the winding 21 between the rectifier 25 and the capacitor 24. In this manner, the discharge of the capacitor through the inductive coil 19 is independent of the oscillating frequency. The charging and discharging of this capacitor can be repeated utilizing any frequency controlling the electronic switch 27.

Figure 4:
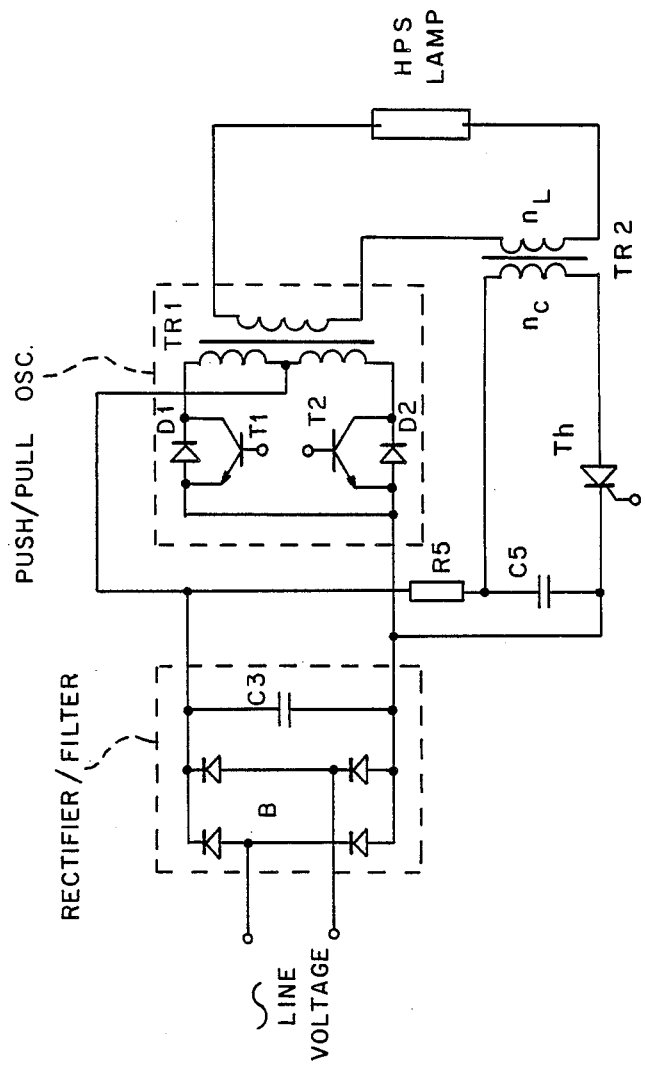
FIG. 4 is a circuit diagram of a high frequency electronic ballast.
Figure 5:
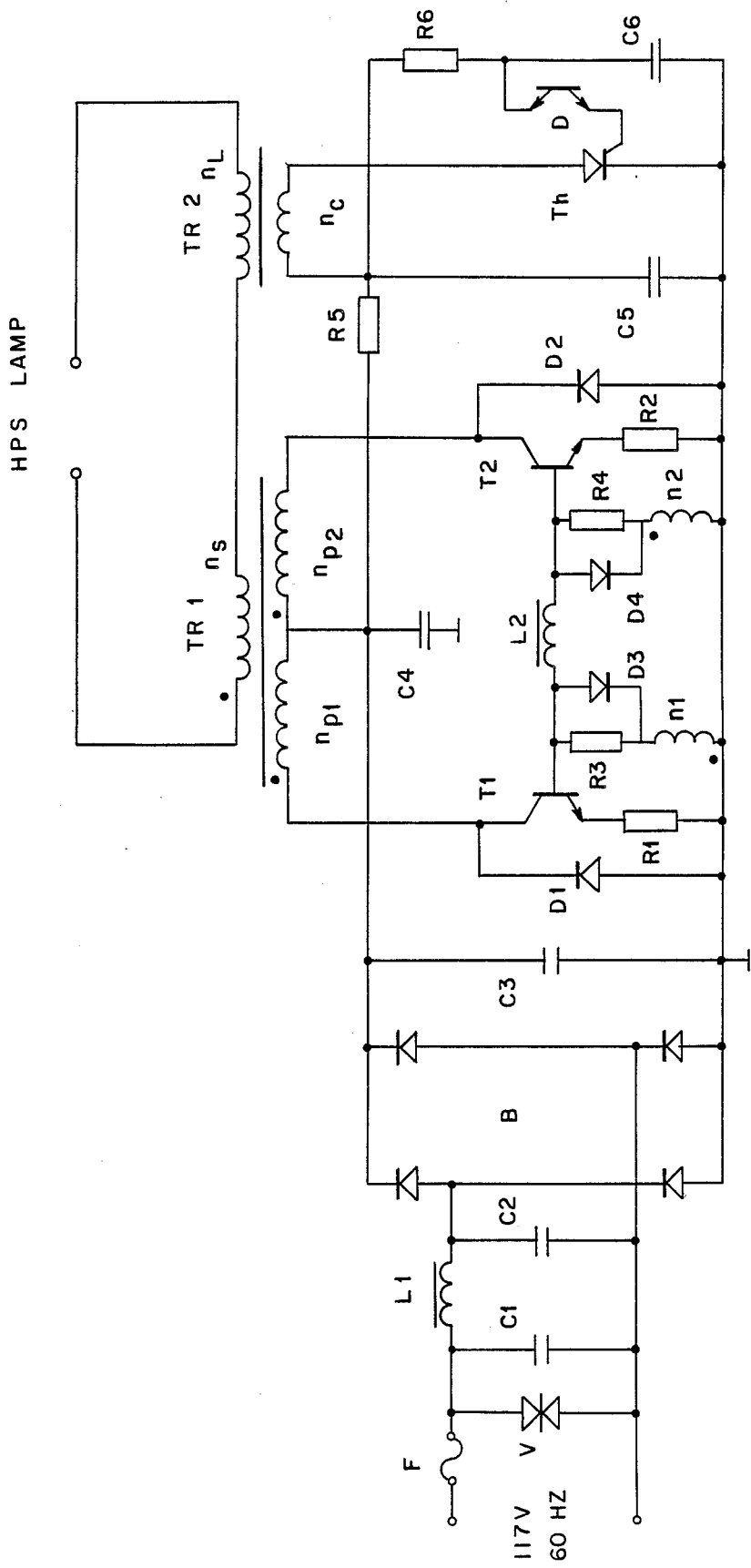
FIG. 5 is a detailed circuit diagram of the high frequency circuitry illustrated in FIG. 4.

FIGS. 4 and 5 illustrate a further embodiment of the present invention describing a high frequency electronic ballast for all types of high pressure lamps.

It is well known in the art that switch-mode, push-pull oscillators produce high frequency symmetrical and square-wave voltage (after the line AC voltage is converted to DC and filtered) so that to its secondary circuit the high pressure lamp is connected thereto in series with a choke having current limiting and stabilizing effects. FIG. 4 illustrates such a circuit which is capable of initiating and maintaining a switch-mode working push-pull oscillator for powering high pressure lamps with a high frequency square-wave voltage. This circuit includes a DC rectifier/filter unit producing the necessary DC voltage from a line voltage needed to power the remaining portions of this circuit. The switch-mode working push-pull oscillator produces twenty to twenty-five kHz symmetrical square-wave voltage in the fluctuation of the line voltage. According to the requirements of the high pressure lamp, the correct voltage amplitude could be produced with selection of the correct turn ratio of the transformer TR1. This voltage is connected to the high pressure lamp and connected in series to the "choke and transformer" TR2. All types of ferrite cores could be utilized for TR2 with suitable air gap or any other shaped ferrite component-like rods or bobbins. The proper calculation of turns $N_c$ and $N_L$ is needed on the selected ferrite component relative to capacitor C5 ($N_c$) to produce the necessary inductivity ($N_L$) required to power the high pressure lamp satisfactorily. One correctly selected value of the ferrite component will provide a ratio of approximately $N_L/N_c = 20$.

FIG. 4 illustrates that resistor R5 will be charged through the capacitor C5 to 140–175 volts dependent upon the line voltage fluctuations. When thyristor Th closes, the above voltage will appear (in the approximate $N_L/N_C = 20$ ratio) between the two windings of $N_L$. In the ideal condition, when the push-pull oscillator works in the switch mode and is being affected by clamping diodes D1 and D2, the voltage on the oscillator primary winding could not be greater than the supply voltage, and the voltage on the secondary side will remain on the level determined by the supply of voltage and the ratio of the transformer.

The apparent voltage on the secondary side of the transformer TR1 which reduces the igniting voltage will stay relatively low because the choke and transformer TR2 and the transformer TR1 are not ideal components, and because the clamping diodes D1 and D2 have limited switching capacity. Consequently, the igniting voltage which is required to start the high pressure lamp will be insignificantly reduced to provide a safe start. The affect of capacitor C5 on the lamp side of choke and transformer TR2 will be insignificant considering the value of the capacitance needed and the fact that this value will be reduced greatly with the turns ratio in quadratic proportion (approximately 400 times). Finally, when the igniting impulse appears on the oscillators, TR1 transformer, NP1 and NP2 windings, an opposite phase voltage impulse is created which will start the desired frequencies.

FIG. 5 is a detailed circuit diagram incorporating the components illustrated in FIG. 4. This circuitry includes a fuse F and varistor V which protect the entire circuitry from outside high voltage impulses. Radio frequency interferences are reduced through the unit by the inclusion of choke L1 and capacitors C1 and C2. The desired DC voltage is produced utilizing rectifier bridge B and buffer capacitor C3.

The switch-mode, push-pull oscillator is an improvement on the so-called Jensen circuitry consisting of switching transistors T1 and T2, clamping diodes D1 and D2, base resistors R3 and R4, transformer TR1 with its Np1 and Np2 primary windings and Ns secondary winding wherein N1=N2, and furthermore including saturating inductance L2 and capacitor C4. Resistors R1 and R2 are emitter resistors and fast diodes D3 and D4 are connected in parallel to resistors R3 and R4.

The fast acting diodes D3 and D4 are designated to improve the switching activity of transistors T1 and T2. Emitter-resistors R1 and R2 are added to improve the symmetry characteristic of the oscillator since the increase of the collector current (and consequently the emitter current) by the increase of the base-emitter voltage with the growing voltage on the saturation inductance L2 will be reduced. This effect works against an undesirable current surge (negative feedback) by preventing imbalances in the current symmetry.

Ignition of the high pressure lamp will be as follows: Resistor R5 is the charging resistor for the capacitor C5, while resistor R6 is the charging resistor for capacitor C6. As the voltage increases on the capacitor C5, the voltage of the capacitor C6 will be reduced. When the voltage of this capacitor C6 reaches the switching voltage of diac D, capacitor C6 through the diac D will turn on the thyristor Th. Consequently, the voltage of the charge capacitor C5 will reach the Nc winding of the choke and transformer TR2 and a high voltage impulse of between 2000 and 3000 volts will reach the high pressure lamp which is required to initiate the arc. Capacitor C5 will be discharged very quickly and the current of thyristor Th will sink to a level which will switch off, and a new charging igniting period will be commenced again.

While a preferred embodiment of the present invention has been shown and described in detail, it is to be understood that such adaptations and modifications as may occur to those skilled in the art may be employed without departing from the spirit and scope of the invention as set forth in the following claims.

What is claimed is:

1. An electronic ballast for a high pressure lamp including:

a transformer connected to the high pressure lamp; and a push-pull amplifier connected to said transformer and a source of line voltage, said push-pull amplifier including a pair of clamping diodes, a pair of switching transistors, each of said switching transistors connected to one of said clamping diodes, a pair of base resistors, a pair of emitter resistors, and a pair of fast diodes connected in parallel to said base resistors.

2. The electronic ballast in accordance with claim 1 further including a choke and transformer starting circuit connected to said high pressure lamp.

3. A gas discharge system comprising:

a gas discharge device; and a variable impedance electronic ballast connected to said device, said ballast consisting of an inductively coupled oscillator comprising a first transformer having a primary and secondary windings and first and second electronic switches connected to said secondary windings, said electronic ballast further including a second transformer having a secondary connected to said gas discharge device, an inductive coil connected in series with said gas discharge device and a means sensitive to the change of the impedance of said gas discharge device and said inductive coil and automatically compensating for said change in impedance to provide a relatively constant current through said gas discharge device, said means sensitive to the impedance connected to said inductive coil, the secondary of said second transformer and in series with the primary of said first transformer.

4. The gas discharge system in accordance with claim 3 wherein said means sensitive to the impedance consists of a parallel combination of a first resistor and first capacitor connected to said oscillator and to one of said electronic switches.

5. The gas discharge system in accordance with claim 3 further including a starting circuit connected across said inductive coil, said starting circuit including a series combination of a second resistor and a second capacitor and a parallel combination of a rectifier and a third resistor.

6. The gas discharge system in accordance with claim 4 further including a starting circuit connected across said inductive coil, said starting circuit including a series combination of a second resistor and a second capacitor and a parallel combination of a rectifier and a third resistor.

7. The gas discharge system in accordance with claim 3 further including a starting circuit connected across said inductive coil, said starting circuit including a series combination of a second resistor and a rectifier and a parallel combination of a third electronic switch and a second capacitor.

8. The gas discharge system in accordance with claim 4 further including a starting circuit connected across said inductive coil, said starting circuit including a series combination of a second resistor and a rectifier and a parallel combination of a third electronic switch and a second capacitor.

* * * * *